(12) United States Patent
Yustus et al.

(10) Patent No.: US 10,086,739 B2
(45) Date of Patent: Oct. 2, 2018

(54) SELF-DEPLOYING TELESCOPING JIB CRANE SYSTEM

(71) Applicant: Konecranes Plc, Hyvinkää (FI)

(72) Inventors: Joseph A. Yustus, Hartford, WI (US); Joel Chellman, Kenosha, WI (US)

(73) Assignee: Konecranes Global Corporation, Hyvinkää (FI)

( * ) Notice: Subject to any disclaimer, the term of this patent is extended or adjusted under 35 U.S.C. 154(b) by 364 days.

(21) Appl. No.: 14/865,916

(22) Filed: Sep. 25, 2015

(65) Prior Publication Data
US 2016/0090018 A1 Mar. 31, 2016

Related U.S. Application Data

(60) Provisional application No. 62/055,145, filed on Sep. 25, 2014.

(51) Int. Cl.
| | |
|---|---|
| *B60P 1/54* | (2006.01) |
| *B66C 23/18* | (2006.01) |
| *B66C 23/80* | (2006.01) |
| *B65G 67/04* | (2006.01) |
| *B66C 13/16* | (2006.01) |
| *B66C 23/16* | (2006.01) |
| *B66C 23/42* | (2006.01) |
| *B66C 23/00* | (2006.01) |
| *B66C 23/68* | (2006.01) |

(52) U.S. Cl.
CPC .............. *B60P 1/548* (2013.01); *B65G 67/04* (2013.01); *B66C 13/16* (2013.01); *B66C 23/16* (2013.01); *B66C 23/18* (2013.01); *B66C 23/42* (2013.01); *B66C 23/54* (2013.01); *B66C 23/68* (2013.01); *B66C 23/80* (2013.01)

(58) Field of Classification Search
CPC ........... B66C 23/42; B66C 23/44; B60P 1/548
USPC ....................................................... 414/543
See application file for complete search history.

(56) References Cited

U.S. PATENT DOCUMENTS

| | | | |
|---|---|---|---|
| 3,777,919 A | 12/1973 | Konijn | |
| 3,944,081 A * | 3/1976 | Wellman ................. | B66C 23/34 212/296 |
| 4,111,316 A * | 9/1978 | Wappler ................. | B66C 23/40 212/180 |
| 4,260,064 A * | 4/1981 | Ekstam ................. | B66C 23/702 212/231 |

(Continued)

FOREIGN PATENT DOCUMENTS

| | | |
|---|---|---|
| EP | 2327654 | 6/2011 |
| WO | 2005108685 | 11/2005 |
| WO | 2014046213 | 3/2014 |

OTHER PUBLICATIONS

European Search Report for Application No. EP15186909 dated Feb. 11, 2016 (3 pages).

*Primary Examiner* — Jonathan Snelting
(74) *Attorney, Agent, or Firm* — Michael Best & Friedrich LLP

(57) ABSTRACT

A crane system includes a skid assembly having an operator base and plurality of outrigger assemblies coupled to the operator base that support and lift the base from a first elevation to a second elevation. The crane system also includes a jib crane coupled to the skid assembly. The jib crane includes a pillar assembly coupled to the skid assembly and a boom assembly coupled to the pillar assembly.

19 Claims, 5 Drawing Sheets

(56) References Cited

U.S. PATENT DOCUMENTS

| | | | | |
|---|---|---|---|---|
| 4,596,336 | A | * | 6/1986 | Zwagerman .......... B66C 23/701 |
| | | | | 212/199 |
| 4,953,722 | A | * | 9/1990 | Becker .................... B66C 23/76 |
| | | | | 212/178 |
| 5,014,863 | A | * | 5/1991 | Vlaanderen ............. B66C 23/42 |
| | | | | 212/261 |
| 5,431,526 | A | * | 7/1995 | Peterson ............... B60P 1/5433 |
| | | | | 212/223 |
| 5,642,821 | A | * | 7/1997 | Hafliger ................. B66C 23/42 |
| | | | | 212/177 |
| 5,769,251 | A | | 6/1998 | Wada et al. |
| 6,341,705 | B1 | * | 1/2002 | Kaspar ............... B62D 33/0633 |
| | | | | 212/291 |
| 7,328,810 | B1 | * | 2/2008 | Rhodes .................. B66C 23/80 |
| | | | | 212/180 |
| 2009/0116947 | A1 | * | 5/2009 | Piccioni .................... B25J 3/04 |
| | | | | 414/732 |

* cited by examiner

SELF-DEPLOYING TELESCOPING JIB CRANE SYSTEM

CROSS-REFERENCE TO RELATED APPLICATIONS

This application claims priority to U.S. Provisional Application No. 62/055,145, filed Sep. 25, 2014, the entire contents of which are incorporated herein by reference.

FIELD OF THE INVENTION

The present application relates generally to a crane system, and in particular to a jib crane system that is used to move materials such as barrels or other containers that contain radiological material.

BACKGROUND

Crane systems are commonly used to lift and move materials. However, there is a growing need for a crane system which is a self-contained material handling system within a concise footprint, and which can further be rapidly deployed in the handling of barrels or other containers that contain radiological material in remote locations.

SUMMARY

In accordance with one construction, a crane system includes a skid assembly having an operator base and plurality of outrigger assemblies coupled to the operator base that support and lift the base from a first elevation to a second elevation. The crane system also includes a jib crane coupled to the skid assembly. The jib crane includes a pillar assembly coupled to the skid assembly and a boom assembly coupled to the pillar assembly.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited.

DETAILED DESCRIPTION

Figure 1:
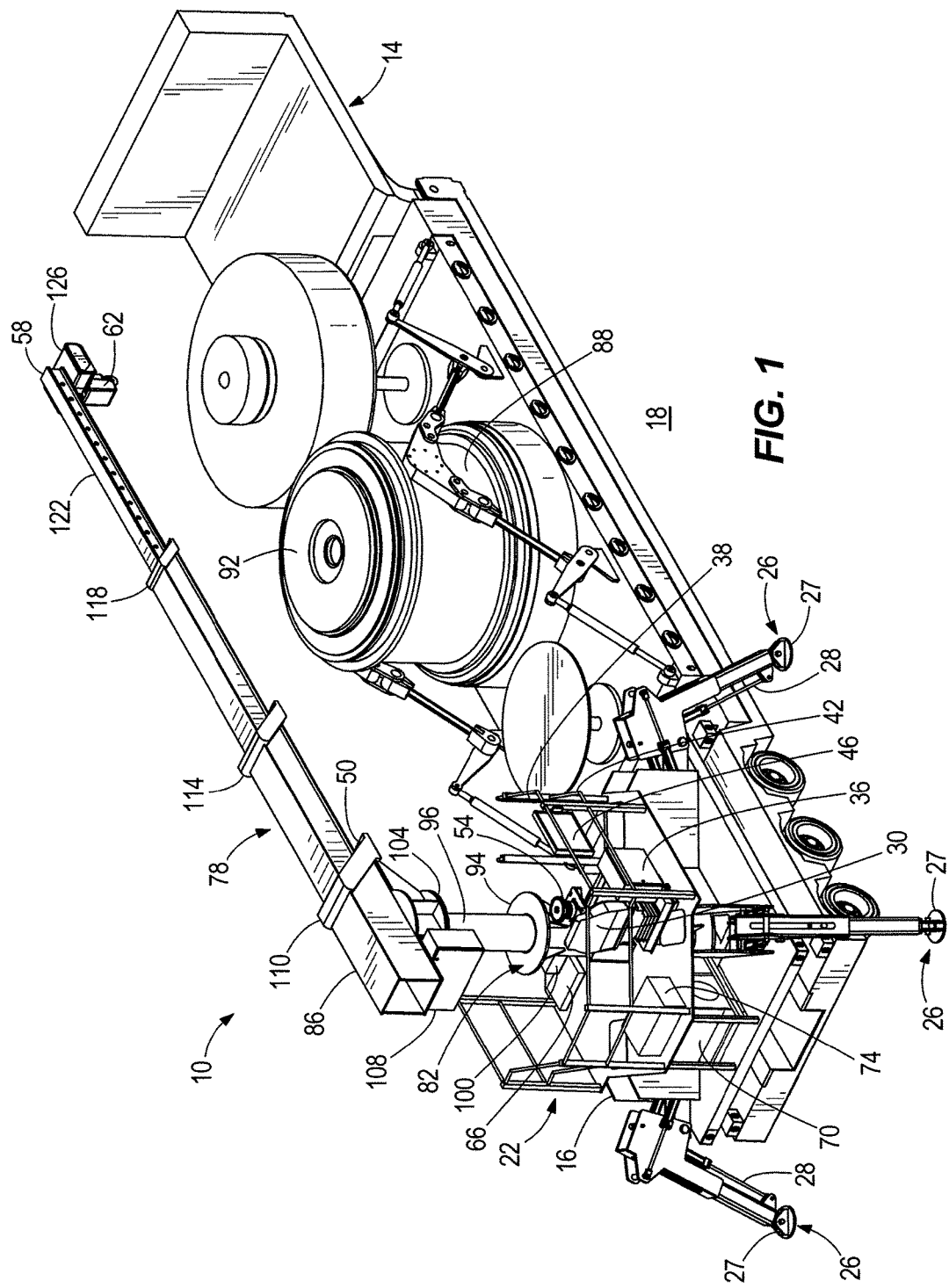
FIG. 1 is a perspective view of a fully-assembled crane system according to one construction disposed on a flatbed semi trailer, with a fully extended pillar assembly and boom assembly.
Figure 2:
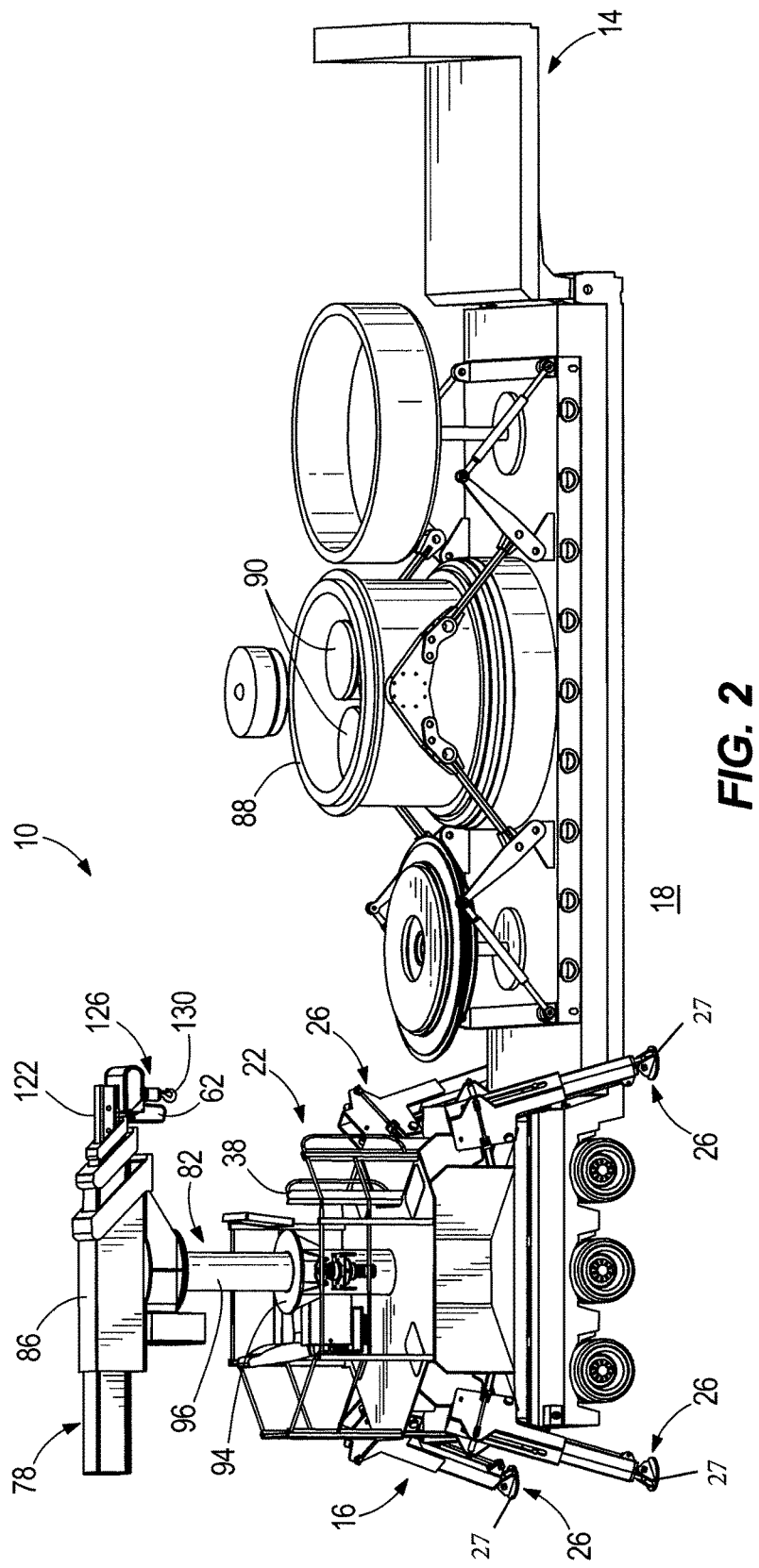
FIG. 2 is a side view of the fully-assembled crane system, illustrating a fully retracted boom assembly.
Figure 3:
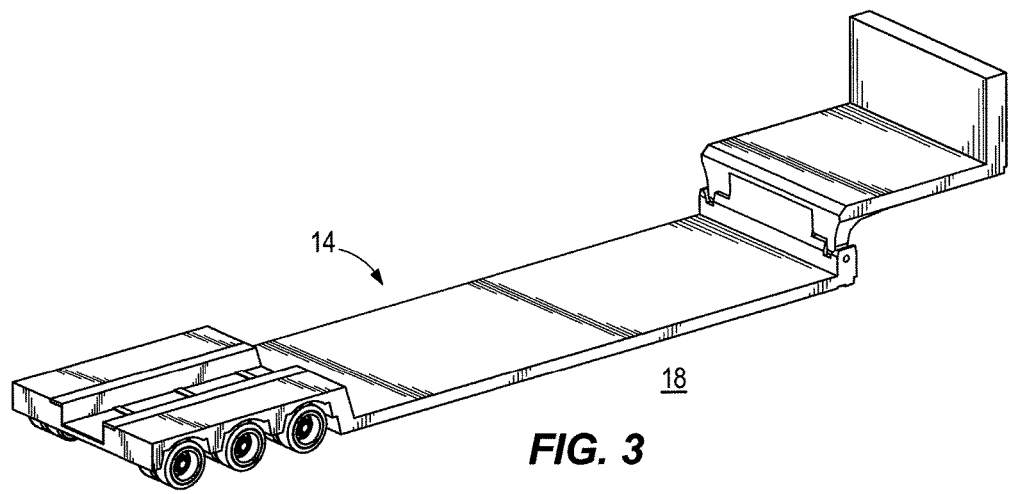
FIG. 3 is a perspective view of the flatbed semi trailer.
Figure 4:
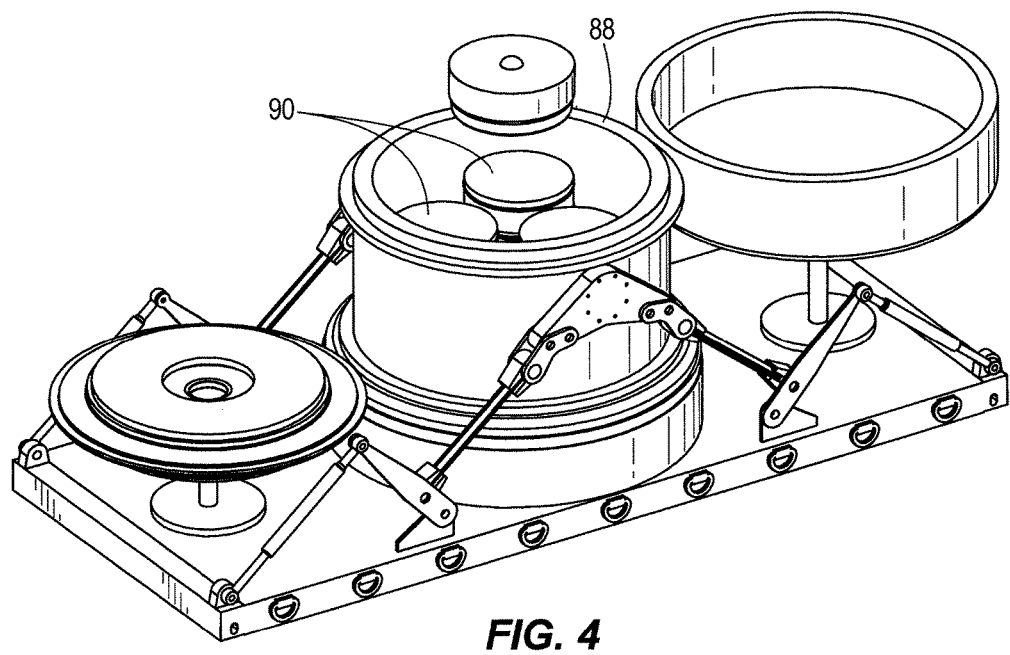
FIG. 4 is a perspective view of canisters and barrels that are carried by the flatbed semi trailer.

FIGS. 1 and 2 illustrate a crane system 10 coupled to a flatbed semi trailer 14 (e.g., a customer-supplied flatbed semi trailer). The crane system 10 includes a skid assembly 16 that provides stability to the crane system 10 and engages a ground surface 18. The skid assembly 16 inhibits sliding or movement of the crane system 10, and also lifts a portion of the crane system 10. In FIGS. 1 and 2 the skid assembly 16 is shown fully engaged with the ground surface 18 and fully un-stowed.

Figure 5:
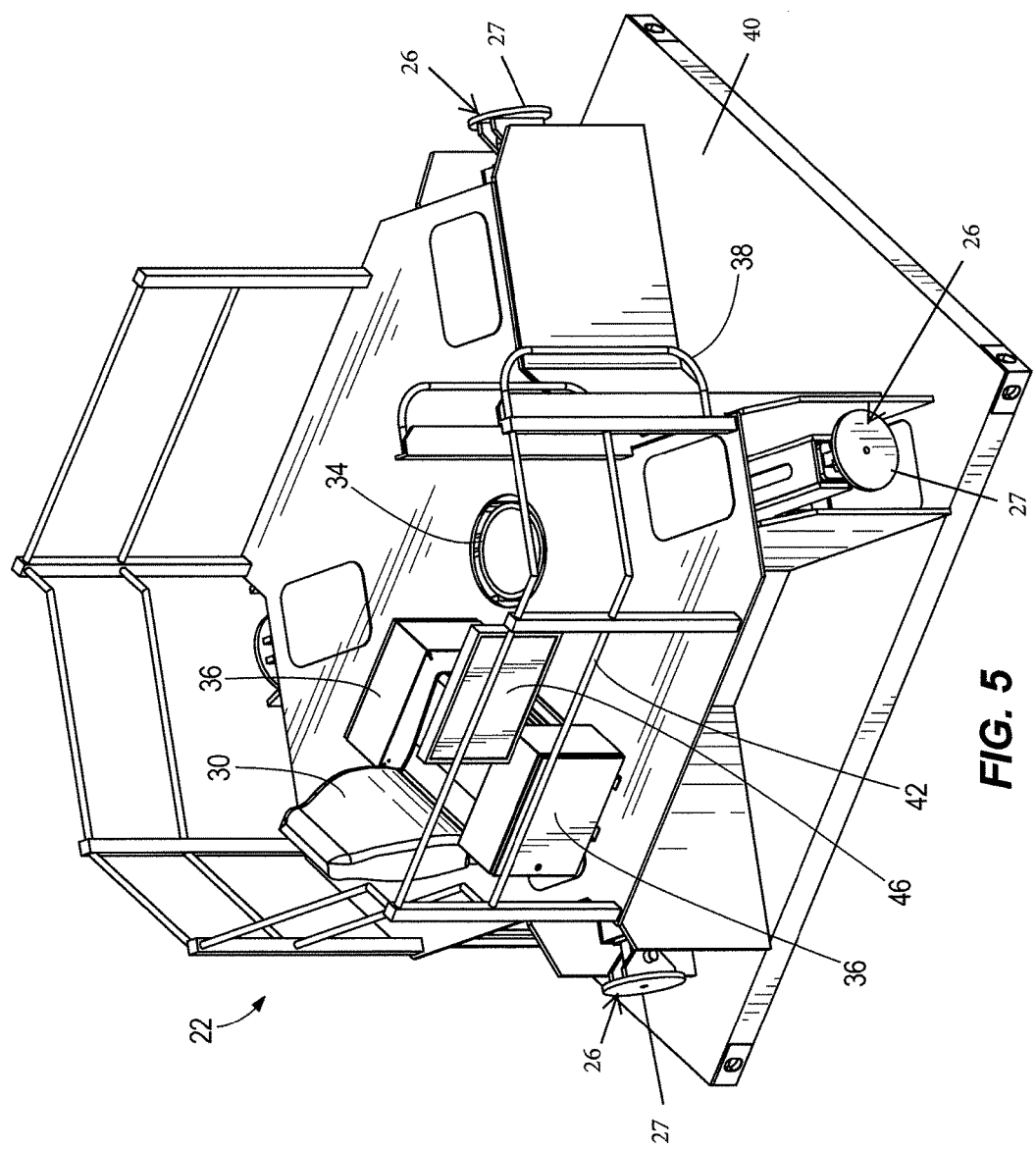
FIG. 5 is a perspective view of an operator base of the crane system.

With reference to FIGS. 1, 2, and 5, the skid assembly 16 includes an operator base 22 coupled to a plurality of outrigger assemblies 26. In the illustrated construction, four outrigger assemblies 26 are provided, spaced generally equally apart from one another (e.g., at 90 degree intervals around the operator base 22). The outrigger assemblies 26 act as legs or supports under the operator base 22. Each of the outrigger assemblies 26 includes a lower foot 27 that engages the ground surface 18. In some constructions, the feet 27 include a surface or surfaces that create traction, and prevent the outrigger assemblies 16 sliding or skidding along the ground surface 18. In the illustrated construction, the operator base 22 is welded directly to the outrigger assemblies 26. In other constructions, the operator base 22 is coupled to the outrigger assemblies 26 with fasteners or other structures. Other constructions include different numbers and locations of outrigger assemblies 26. FIG. 5 illustrates a stowed (e.g., retracted) position of the outrigger assemblies 26 and FIG. 1 illustrates a deployed (e.g., extended) position of the outrigger assemblies 26.

Figure 6:
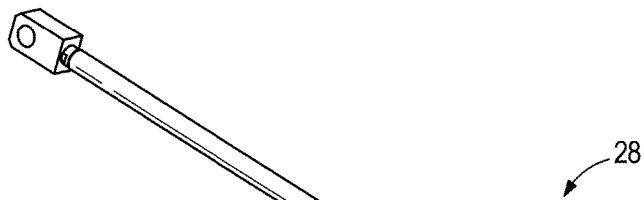
FIG. 6 is a perspective view of a hydraulic cylinder used in a skid assembly of the crane system.

With reference to FIGS. 1 and 6, in the illustrated construction, each of the outrigger assemblies 26 includes one or more hydraulic cylinders 28. The outrigger assemblies un-stow themselves (e.g., expand downward toward the ground surface 18) through sequenced kinematic motion of the one or more hydraulic cylinders 28 (FIG. 6).

With reference to FIGS. 1 and 5, in the illustrated construction, the operator base 22 rests on the flatbed semi trailer 14 and includes an operator chair 30 offset from a center component 34 (FIG. 5). In the illustrated construction, the operator chair 30 includes at least one side support 36. The operator base 22 also includes an access ladder 38, a lower plate 40 that rests on the semi trailer 14, and protective hand rails 42. The operator base 22 also includes a controller 46 (e.g., coupled to one of the hand rails 42) which includes a display that displays feeds from various system cameras 50, 54, 58, 62. Other constructions include different numbers and locations of system cameras. In some constructions no cameras are provided. Additionally, in other constructions the controller 46 or other similar component is provided in a different location than that shown.

In the illustrated construction, the operator base 22 further includes an engine 66 (e.g., a diesel engine) that drives a pump drive of a hydraulic generator 70. The hydraulic generator 70 supplies power to a hydraulic power unit 74. In some constructions, a switch gear is provided, which allows the hydraulic power unit 74 to work with remote power in the event zero emissions are required.

With reference to FIG. 1, the crane system 10 also includes a telescoping jib crane 78 coupled to the skid assembly 16. The jib crane 78 includes a pillar assembly 82 and a boom assembly 86 coupled to the pillar assembly 82. The jib crane 78 deploys under operator control (e.g., via the controller 46) from a stowed (e.g., retracted) transport position to a deployed (e.g., extended) position through telescoping of both the pillar assembly 82 and the boom assembly 86, vertically and horizontally respectively.

With reference to FIGS. 1-4, the jib crane 78 is used to lift and move materials, such as portions of specially designed canisters 88 (FIGS. 2 and 4) filled with barrels 90 that contain radiological material. The barrels 90 are any type of container or element that is used to store material inside. In the illustrated construction the jib crane 78 is used to lift and move lids 92 (FIG. 1) of the canisters 88, and to also lift and move the barrels 90 themselves.

With reference to FIGS. 1 and 2, in the illustrated construction, the pillar assembly 82 includes a welded structural steel pipe construction that includes an outer pillar assembly 94 and a guided inner pillar assembly 96. Guided vertical travel and movement of the inner pillar assembly 96 is accomplished by an inner hydraulic cylinder (not shown).

The inner pillar assembly 96 is coupled directly to the boom assembly 86. In the illustrated construction, full rotation of 360 degrees of the boom assembly 86 is possible through a hydraulic/mechanical drive component 100 and a hydraulic/electrical slip ring component 104, which transfers hydraulic and electrical potential to the boom assembly 86.

Figure 7:
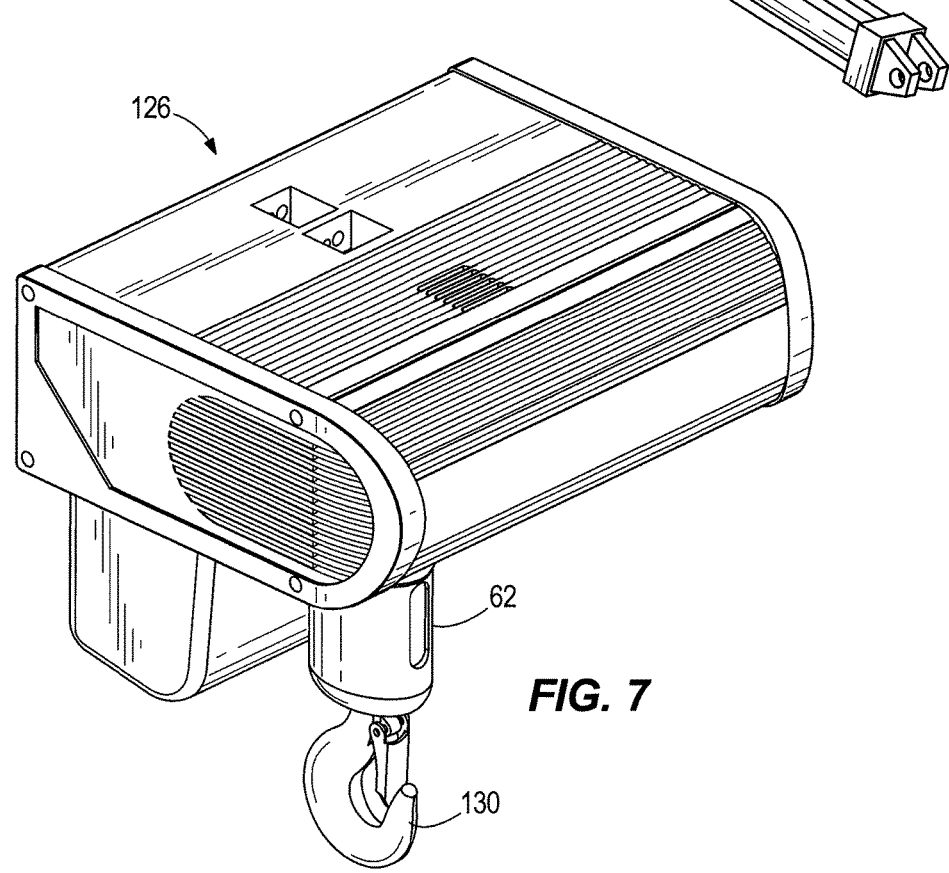
FIG. 7 is a perspective view of a grapple used on a boom assembly of the crane system.

With reference to FIGS. 1, 2, and 7, in the illustrated construction, the boom assembly 86 includes a welded structural steel box construction with multiple sections 108, 110, 114, 118, and 122, at least two of which (e.g., four of which) that move telescopingly relative to one another. In the illustrated construction, a first section 110 is coupled directly to the pillar assembly 82. A second section 114 is telescopingly coupled to the first section 110. A third section 118 is telescopingly coupled to the second section 114, such that the second section 114 is disposed between the first and third sections 110, 118. A fourth section 122, forming part of a distal end of the boom assembly 86, is telescopingly coupled to the third section 118, such that the third section 118 is disposed between the second and fourth sections 114, 122. In some constructions, the section 108 is an electrical control box for distribution of electrical power. In the illustrated construction, three hydraulic cylinders (e.g., located interior to one or more of the telescoping components 110, 114, 118, 122 are used to generate a telescoping horizontal movement of the boom assembly 98.

In the illustrated construction, one of the cameras 50 is coupled to the first section 110, and gives the operator a view of a loading area. Another of the cameras 54 is coupled to the pillar assembly 82 and provides the operator a view at a top elevation component of the canisters 88.

With continued reference to FIGS. 1, 2, and 7, a hoisting component 126 and another of the cameras 58 are coupled to an end of the fourth section 122. The camera 58 is in an orientation that gives the operator a bird's eye view from an end of the boom assembly 98 elevation. The hoisting component 126 includes a grapple 130 (FIG. 2) that is specifically designed to handle both the canister lids 92 and the barrels 90. The grapple 130 further includes another of the cameras 62, which gives the operator a closer bird's eye view of the grapple's interfacing with the canisters 88 and the barrels 90.

The crane system 10 is self-deploying, and may be coupled to various flatbed semi trailers. For example, after the outrigger assemblies 26 are un-stowed and the feet 27 contact the ground surface 18, the outrigger assemblies 26 then lift the operator base 22 (e.g., with the hydraulic cylinders 28) from a first elevation (e.g., a ground elevation) to a second elevation where a flatbed semi trailer (e.g., the flatbed semi trailer 14) can be maneuvered under the skid assembly 16. In some constructions, multiple non-retractable twist lock mechanical engagements are then used to secure the skid assembly 16 to the flatbed semi trailer.

The skid assembly 16 (and the coupled jig crane 78) are leveled horizontally and vertically via the hydraulic/mechanical outrigger assemblies 26. This allows the jib crane 78 vertical loading to be transmitted through the outrigger assemblies 26 to the ground surface 18. In some constructions, the flatbed semi trailer 14 is primarily used for stability and horizontal loading. In some constructions, the outrigger assemblies 26 provide all or substantially all of the vertical support for the operator base 22 as well as the telescoping jib crane 78.

Although the invention has been described in detail with reference to certain preferred embodiments, variations and modifications exist within the scope and spirit of one or more independent aspects of the invention as described.

What is claimed is:

1. A crane system comprising:
a skid assembly having an operator base, the operator base including a lower plate configured to rest on a semi trailer, the skid assembly further including a plurality of outrigger assemblies coupled to the operator base that support and lift the operator base from a first elevation to a second elevation, wherein the outrigger assemblies are movable from a fully extended position where portions of the outrigger assemblies extend below the lower plate to support the operator base, to a fully retracted position where the outrigger assemblies are each disposed entirely above the lower plate, wherein each outrigger assembly includes a leg and a lower foot coupled to the leg, the lower foot configured to engage a ground surface in the extended position, wherein the lower foot of each outrigger assembly is configured to extend outwardly over an edge of the lower plate and then downwardly below the lower plate when moving from the fully retracted position to the fully extended position; and
a jib crane coupled to the skid assembly, the jib crane having a pillar assembly coupled to the skid assembly, and a boom assembly coupled to the pillar assembly.

2. The crane system of claim 1, wherein the plurality of outrigger assemblies includes four outrigger assemblies coupled to the operator base, each of the four outrigger assemblies extending below the operator base, and wherein the jib crane extends above the operator base.

3. The crane system of claim 1, wherein each of the plurality of outrigger assemblies includes a lower foot that is configured to engage a ground surface.

4. The crane system of claim 1, wherein the operator base is welded directly to the plurality of outrigger assemblies.

5. The crane system of claim 1, wherein each of the plurality of outrigger assemblies includes a hydraulic cylinder.

6. The crane system of claim 1, further comprising at least one camera coupled to the jib crane.

7. The crane system of claim 6, further comprising a controller that displays feeds from the at least one camera.

8. The crane system of claim 7, wherein the controller is coupled to the operator base.

9. The crane system of claim 1, wherein the boom assembly includes a welded structural steel box.

10. The crane system of claim 1, wherein the pillar assembly extends vertically from the operator base, and the boom assembly extends horizontally from the pillar assembly.

11. The crane system of claim 1, wherein the pillar assembly is a telescoping assembly and the boom assembly is a telescoping assembly, the crane system further including a controller that controls telescoping vertical movement of the pillar assembly and telescoping horizontal movement of the boom assembly.

12. The crane system of claim 11, wherein the controller also controls rotational movement of the boom assembly, wherein the boom assembly is rotatable 360 degrees.

13. The crane system of claim 1, wherein the boom assembly includes a first section coupled to the pillar assembly, a second section telescopingly coupled to the first section, a third section telescopingly coupled to the second section such that the second section is disposed between the first and third sections, and a fourth section telescopingly coupled to the third section such that the third section is disposed between the second and fourth sections.

14. The crane system of claim 13, wherein a first camera is coupled to the first section and a second camera is coupled to the fourth section.

15. The crane system of claim 14, wherein a third camera is coupled to the pillar assembly.

16. The crane system of claim 13, wherein a hoisting component is coupled to the fourth section.

17. The crane system of claim 1, wherein the lower plate is a substantially planar, rectangular plate.

18. The crane system of claim 1, wherein the plurality of outrigger assemblies includes a first outrigger assembly, a second outrigger assembly, a third outrigger assembly, and a fourth outrigger assembly, wherein the first, second, third, and fourth outrigger assemblies are spaced equally apart from one another, and wherein when the first, second, third, and fourth outrigger assemblies are in the fully retracted position, the lower foot of the first outrigger assembly faces opposite to the lower foot of the third outrigger assembly and the lower foot of the second outrigger assembly faces opposite to the lower foot of the fourth outrigger assembly.

19. The crane system of claim 1, wherein vertical plates are coupled to the lower plate, wherein each of the plurality of outrigger assemblies is disposed at least partially between a pair of the vertical plates when in the fully retracted position.

* * * * *